US007123905B1

(12) United States Patent
Allaway et al.

(10) Patent No.: US 7,123,905 B1
(45) Date of Patent: *Oct. 17, 2006

(54) CALL DIVERSION SYSTEM

(75) Inventors: Andrew Wayne Allaway, Uxbridge (GB); Martin Philip Usher, Ruislip (GB); Donna McLaren, Welling (GB); Andrew Robert Mead, Bagshot (GB); Elizabeth Clare Lindsay, nee Tisdell, London (GB)

(73) Assignee: Stratos Global Limited, London (GB)

( * ) Notice: Subject to any disclaimer, the term of this patent is extended or adjusted under 35 U.S.C. 154(b) by 314 days.

This patent is subject to a terminal disclaimer.

(21) Appl. No.: 10/088,030

(22) PCT Filed: Aug. 10, 2000

(86) PCT No.: PCT/GB00/03080

§ 371 (c)(1),
(2), (4) Date: Nov. 25, 2002

(87) PCT Pub. No.: WO01/20813

PCT Pub. Date: Mar. 22, 2001

(30) Foreign Application Priority Data

| Sep. 14, 1999 | (EP) | ................................ | 993072792 |
| Sep. 14, 1999 | (GB) | ................................ | 9921722.6 |
| Nov. 3, 1999 | (EP) | ................................ | 993087204 |
| Nov. 3, 1999 | (EP) | ................................ | 993087279 |
| Nov. 3, 1999 | (EP) | ................................ | 993087287 |
| Apr. 14, 2000 | (EP) | ................................ | 003031648 |
| Apr. 14, 2000 | (GB) | ................................ | 0009359.1 |
| Sep. 14, 2000 | (GB) | ................................ | 0009394.8 |

(51) Int. Cl.
*H04M 3/42* (2006.01)

(52) U.S. Cl. ...................... 455/417; 455/431; 455/12.1; 455/445; 455/433; 455/414.1; 455/461; 379/88.25; 379/142.08; 379/215.01

(58) Field of Classification Search ................ 455/431, 455/417, 445, 12.1, 433, 414.1, 435.1, 430, 455/426.1, 422.1, 555, 554.1
See application file for complete search history.

(56) References Cited

U.S. PATENT DOCUMENTS 4,774,514 A 9/1988 Hildebrandt et al.

(Continued)

FOREIGN PATENT DOCUMENTS

EP 0 838 909 4/1998

(Continued)

OTHER PUBLICATIONS

Suzuki et al., "Call Routing and Data Model for Inter-Network Roaming in PCS", IEICE Trans. Commun., vol. E79 B. No. 9, Sep. 1996, pp. 1371-1379.

(Continued)

*Primary Examiner*—George Eng
*Assistant Examiner*—Sharad Rampuria
(74) *Attorney, Agent, or Firm*—Steptoe & Johnson LLP

(57) ABSTRACT

An interface (52) is provided between a satellite telephone system (4) and a cellular telephone system (5) for allowing calls to a user's cellular telephone to be diverted to a satellite telephone (25) when the user is unable to use his cellular telephone, for example when on board an aeroplane (2) fitted with a satellite telephone system (20). The user inserts a card (which may be the SIM of his mobile phone, or a card compatible with existing satellite telephone equipment) into a suitable reader in the satellite telephone (20), which causes the satellite ground station's card verification system (42) to connect to a host cellular network (50). The host cellular network has an interface unit (52) which emulates the operation of a normal base station, so that the host cellular system (50) acts as if the mobile user's terminal is roaming on the host network, but is currently "busy". The interface (52) also resets the user's existing call diversion instructions so that when the host cellular system (5) receives a busy tone frome the base station emulator (52), it routes calls to the directory number of the terminal (20).

37 Claims, 10 Drawing Sheets

U.S. PATENT DOCUMENTS

| | | | |
|---|---|---|---|
| 5,438,610 | A | 8/1995 | Bhagat et al. |
| 5,490,284 | A | 2/1996 | Itoh et al. |
| 5,519,761 | A | 5/1996 | Gilhousen |
| 5,577,264 | A | 11/1996 | Tuohino |
| 5,651,050 | A | 7/1997 | Bhagat et al. ............... 455/431 |
| 5,842,132 | A | 11/1998 | Fukutomi |
| 5,887,258 | A | 3/1999 | Lemozit et al. |
| 5,950,129 | A * | 9/1999 | Schmid et al. ............... 455/431 |
| 5,963,877 | A | 10/1999 | Kobayashi |
| 6,002,929 | A * | 12/1999 | Bishop et al. ............... 455/431 |
| 6,002,944 | A | 12/1999 | Beyda |
| 6,055,425 | A * | 4/2000 | Sinivaara .................... 455/431 |
| 6,269,243 | B1 | 7/2001 | Corbefin et al. |
| 6,314,286 | B1 | 11/2001 | Zicker ........................ 455/422 |
| 6,321,084 | B1 * | 11/2001 | Horrer ........................ 455/431 |
| 6,408,180 | B1 * | 6/2002 | McKenna et al. ........... 455/431 |
| 6,463,278 | B1 * | 10/2002 | Kraft et al. .................. 455/418 |
| 6,529,706 | B1 * | 3/2003 | Mitchell .................... 455/12.1 |
| 6,603,967 | B1 * | 8/2003 | Sinivaara et al. ........... 455/431 |
| 6,611,682 | B1 * | 8/2003 | Projtz ......................... 455/417 |
| 2001/0011016 | A1 * | 8/2001 | Chambers ................... 455/417 |
| 2002/0019229 | A1 * | 2/2002 | Usher et al. ................ 455/431 |
| 2002/0045444 | A1 | 4/2002 | Usher et al. ................ 455/422 |

FOREIGN PATENT DOCUMENTS

| | | |
|---|---|---|
| EP | 0 862 283 | 9/1998 |
| EP | 0 915 577 | 5/1999 |
| EP | 0 920 147 | 6/1999 |
| EP | 0 923 257 | 6/1999 |
| EP | 0 932 266 | 7/1999 |
| EP | 0 936 829 | 8/1999 |
| FR | 2773931 | 7/1999 |
| GB | 2169175 | 7/1986 |
| GB | 2282299 | 3/1995 |
| GB | 2310973 | 9/1997 |
| GB | 2320992 | 7/1998 |
| GB | 2324395 | 10/1998 |
| WO | WO 94/28684 | 12/1994 |
| WO | WO 97/36442 | 10/1997 |
| WO | WO 97/37500 | 10/1997 |
| WO | WO 98/21838 | 5/1998 |
| WO | WO 98/26521 | 6/1998 |
| WO | WO 99/12227 | 3/1999 |
| WO | WO 99/62274 | 12/1999 |
| WO | WO 01/15337 | 3/2001 |

OTHER PUBLICATIONS

Uchiyama et al., "Network Functions and Signaling for Personal Roaming between Digital Cellular Standards", IEEE International Conference on Universal Personal Communications, New York, IEEE, vol. CONF. 4, Nov. 1995, pp. 447-451.

Nodera et al., "Interworking between GSM and PDC through IC Cards", Proceedings of the Conference on Communications (ICC), New York, IEEE, Jun. 1995, pp. 761-765.

GSM World Press Release, "GSM Association Agreement with SkyPhone to use *TAP* for Billing makes Calling from Aircraft Simple", http://www.gsm.org/news/press_releases_04.html, Aug. 1999.

Fernandez et al., "Le TFTS Alcatel 9810: un systemme europeen de communications air-sol", Commutation et Transmission, vol. 13, No. 4, Sotelec, Paris, France, 1991, pp. 5-16.

BTtoday NEWSDESK website, "Lift off for BT in-fligh GSM service", http://today.intra.bt.com/art6594.html, Jul. 2000.

Beresford, "Office in the sky is now ready for take off", BT today, Jan. 2000, p. 4.

International Search Report for PCT/IB01/00830.
International Search Report for PCT/GB00/03074.
International Search Report for PCT/GB00/03087.
International Search Report for PCT/IB01/00811.
International Search Report for PCT/GB00/03088.
International Search Report for PCT/IB01/00802.

* cited by examiner

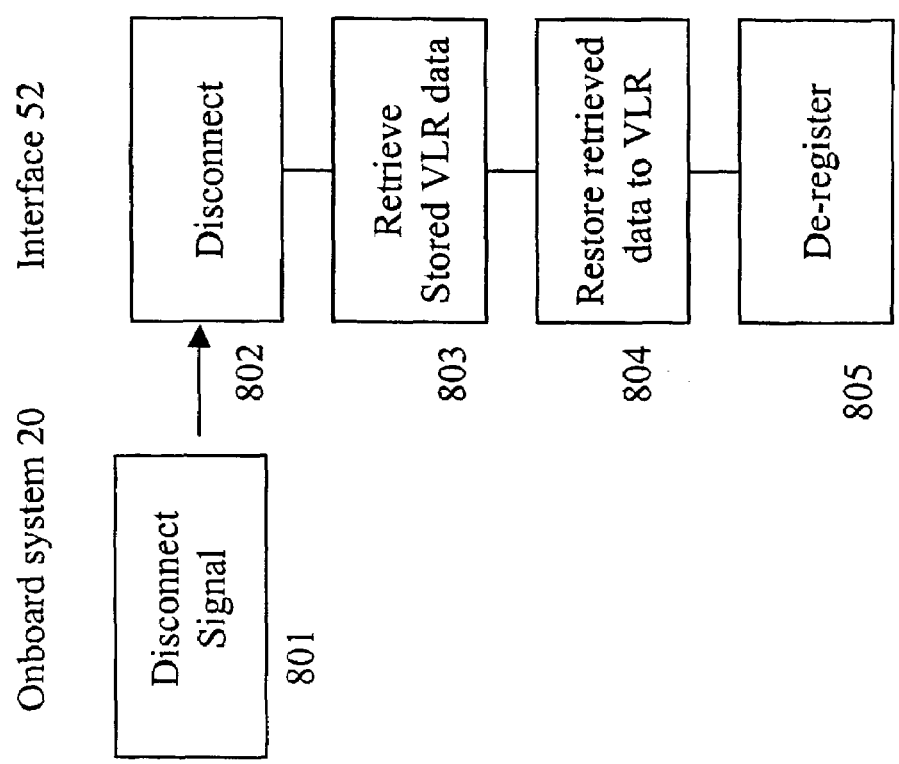
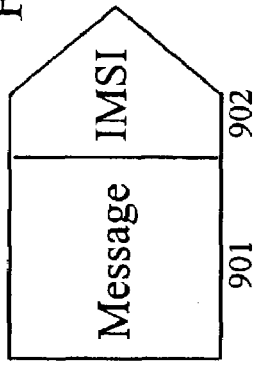
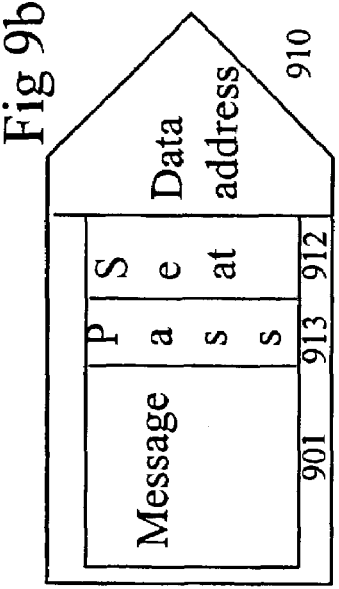
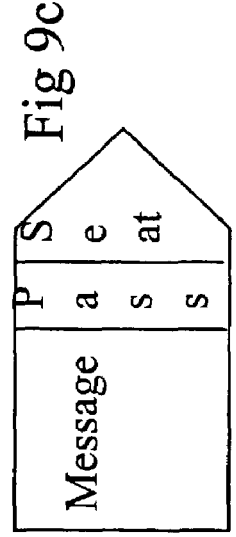

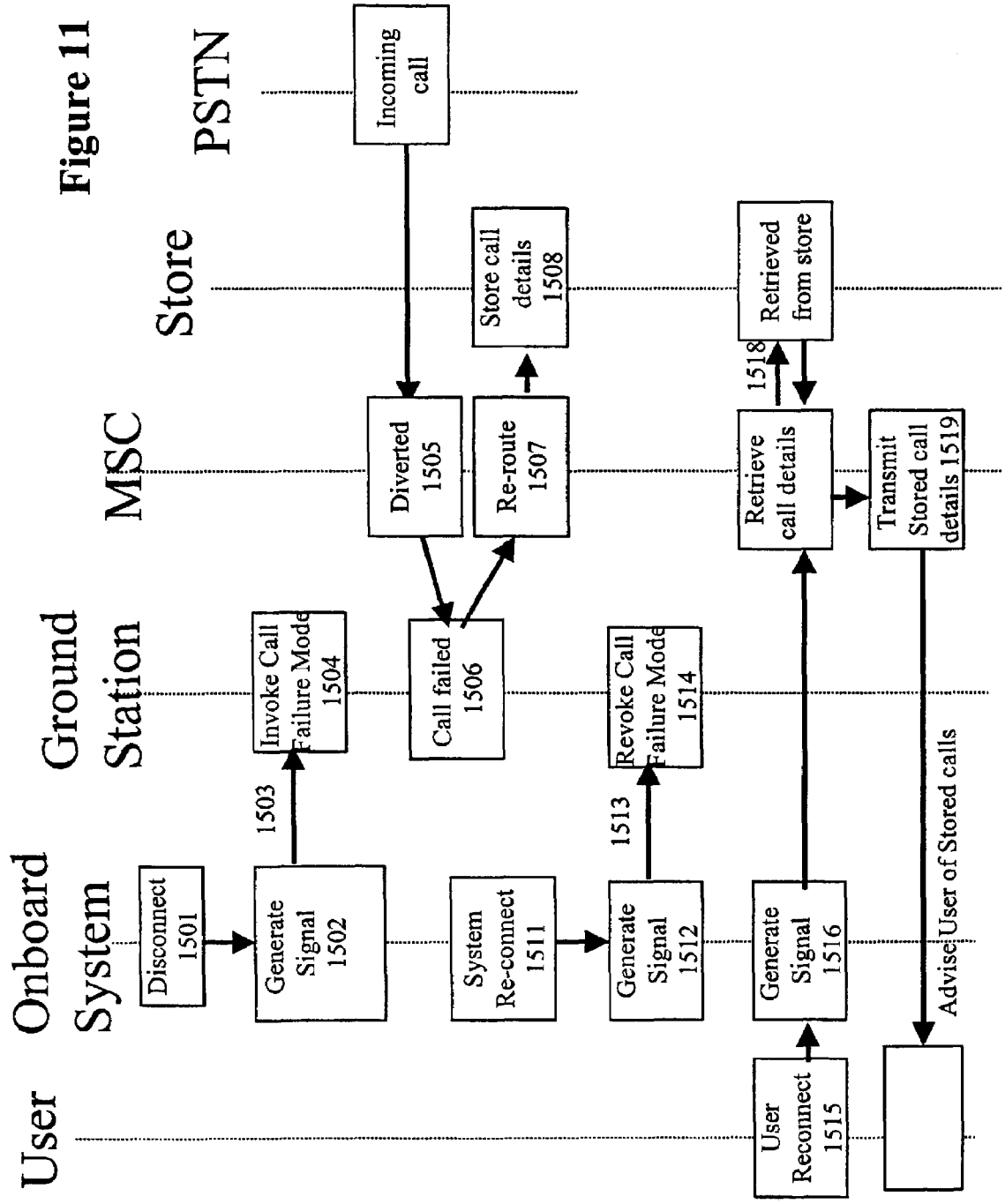

CALL DIVERSION SYSTEM

This invention relates to mobile telephony, and in particular to systems for use on board vehicles.

There has been considerable activity in recent years in proposals to allow the use of mobile telephones in environments where conventional cellular telephony base stations cannot provide coverage, in particular on board ships and aircraft. These vehicles frequently travel beyond the range of land-based cellular base stations, which typically have a range of the order of 1 to 10 km.

There are a number of special difficulties to be addressed if a standard cellular telephone is to be used in an aircraft. Firstly, many cellular base stations have antennas arranged for maximum gain in the horizontal plane, so an airborne cellular telephone may not be able to obtain a signal from any base station, even when flying over land served by a cellular base station network. Even if the radio range of the base stations does extend as high as the normal flying height of aircraft, there are further problems. Frequency re-use patterns, which allow several base stations to use the same radio frequencies without interference, are designed on the assumption that a mobile unit served by one base station is not able to exchange radio signals with other base stations using the same frequency. This assumption ceases to be valid if a mobile unit is several thousand meters above the ground, since it may be in line-of-sight of a large number of base stations simultaneously. Moreover, although reliable handover of a mobile unit can be achieved from moving vehicles travelling at speeds of up to 200 km/h, a typical passenger aircraft travels at speeds approaching 1000 km/h. Airlines also impose restrictions on the use of powerful radio signals on board, as a precaution against possible interference with the aircraft's electronic systems.

For truly global coverage, satellite telephones are available. However, these are expensive and much heavier than a cellular telephone. Both cellular telephones and satellite telephones also suffer from the screening effect of being inside a metal hulled vehicle. As with cellular telephones, the unrestricted use of a portable satellite telephone within an aircraft may be prohibited.

A user without his own satellite telephone may use special facilities provided on board, such as the service provided to several airlines by the applicant company under the Registered Trade Mark "Skyphone". This uses onboard terminals connected, through a satellite link between the aircraft and a satellite ground station, to the telephone network. Another system, TFTS (terrestrial flight telephony system, marketed as "Jetphone"), operates in a similar manner, but uses a direct link between the aircraft and the ground station, without a satellite link. Similar systems are provided on board ships. However payment for these services is generally at the point of use (or prepaid), and may be in a foreign currency. Calls made to the user's cellular telephone will not be successful unless the calls can be diverted to the telephone number of the onboard user terminal (which will generally not be known to the caller), and any special facilities offered by the user's cellular network will in general be unavailable. A user with his own cellular telephone account which, through "roaming" agreements between network operators, can be used in many different countries, would therefore prefer to continue to use his cellular telephone subscription when travelling within or between these countries on board an aircraft or other vehicle.

According to a first aspect of the invention there is provided apparatus for enabling a first termination point of a first telecommunications system to initiate call diversion instructions in the switching system of a second telecommunications system such that calls initially directed to a telephone apparatus usable with the second telecommunications system are diverted to a selected termination point in the first telecommunications system, the apparatus comprising means in the first telecommunications system for identifying the telephone apparatus from which calls are to be diverted and the selected termination point to which calls are to be diverted, and an interface means between the first telecommunications system and the switching system of the second telecommunications system, the interface means comprising:

means to indicate to the switching system that the telephone apparatus is in a specified operating condition, irrespective of the true operating condition of the telephone apparatus, and means to generate an instruction to the switching system to divert calls, intended for the telephone apparatus, to the said selected termination point of the first telecommunications system when the telephone apparatus is indicated as being in the said predetermined operating condition.

A second aspect of the invention provides a first telecommunications system, arranged for interconnection with a second telecommunications system to allow calls initially directed to a telephone apparatus usable with the second telecommunications relating to the telephone apparatus, means for receiving associated identification information relating to the selected termination point, means for transmitting the identification information to a network interface unit, means for receiving authentication data from the interface unit, and means for connecting calls to or from the selected termination point in response to said authentication data. In the preferred arrangement the first and second telecommunications systems are a satellite telephone system and a cellular telephone system respectively, the identification information being a user identity associated with the telephone apparatus, and the network address of the selected termination point.

A third aspect provides a network interface unit for interconnecting a first telecommunications system with a second telecommunications system such that calls directed to telephone apparatus configured for use with the second telecommunications system may be diverted to a selected termination point in the first telecommunications system, the interface unit comprising:

means for receiving data identifying a user and a first termination point in the first network, means to indicate to the switching system of the second telecommunication system that a telephone terminal associated with the user is in a specified operating condition, irrespective of the true operating condition of the telephone terminal, and means to generate an instruction to the switching system of the second telecommunications system to divert calls directed to the telephone user to the said selected termination point of the first telecommunications system when the telephone apparatus is indicated as being in the said predetermined operating condition.

The telecommunications termination points may, for example, be user terminals of a satellite telephone system. They may be provided with reading apparatus for reading an information carrier encoded with the user's identity. Such apparatus is commonly used for telephone terminals to which the public have access to allow calls to be charged to a user's credit card account, or an account with the service provider, or to deduct value from a stored value on the card.

In those cellular systems where the user identity is carried on a data carrier card transferable between telephone handsets, the reading apparatus may be arranged to read this carrier. In the "GSM" standard these cards are known as "Subscriber Identity Modules" or SIMs, and are either of standard credit card size (86 mm×54 mm) or rather smaller (14 mm×25 mm), and may be transferred from one cellular telephone handset to another to allow the same telephone user account and directory number to be used with different handsets.

Another embodiment allows the onboard user terminal to co-operate with the complete cellular telephone. Although this requires a more complex interface between the cellular telephone and the user terminal, it allows the user to use the functionality of his own telephone, rather than having to familiarise himself with that of an unfamiliar satellite user terminal.

However, as standard on-board satellite telephone card readers may not be compatible with GSM "SIMs", or complete telephones, the user identity, or a code allowing its retrieval, may be carried on a special carrier compatible with the card reader to be used, and supplied to users wishing to make use of the facility.

In a further variant, falling within the scope of the invention, the user may gain authorisation for use of the system by entering a predetermined identification code using the user terminal, for transmission to the interface unit which then retrieves the user identity and establishes the diversion process as already discussed.

In the cellular telephone system of the preferred embodiment the interface unit is arranged to appear to the switching system as if it is a typical radio base station control system, to which the mobile handset is currently working, although in fact no radio base stations are actually controlled by it. This will be referred to as a "Virtual" Base Site Controller. The switching system itself requires no modification: it merely registers that the user is working to the "Virtual" Base Site Controller and stores the user details in its "Visitor Location Register" (VLR) as it would for a mobile unit working to any real base site controller to which it is connected. The interface unit also generates a call diversion instruction, which will appear to the switching system to have come from the mobile handset, by way of the "Virtual" Base Site Controller. This call diversion instruction is set up in the switching system such that if the "Virtual" Base Site Controller responds to a call request directed to the mobile unit with a "busy line" response (or some other specified condition), calls are to be diverted, through normal network interconnects, to a specified directory number, namely that of the satellite termination point to which the user is connected. The interface unit does not in fact monitor the real condition of the user terminal, (which is switched off or operatively connected to the satellite network termination point by a non-radio link), but instead always returns the "line busy" signal to the switching system.

Preferably, the interface includes a store to record any diversion settings existing for the telephone apparatus prior to the diversion to the second network being set up. This allows these settings to be retrieved when the user disconnects from the first telecommunications system, so that they can be reinstated in the switching system of the second telecommunications system or transferred to a further telecommunications system if the telephone apparatus makes contact with a real radio base station, thereby initiating a handover procedure from the "Virtual" Base Site Controller to the real one.

Should a second call attempt be made, the switching system may be arranged to divert it to a predetermined number such as the user's voice mail. The interface unit may be arranged to transmit a message to the termination point to indicate that such a voice mail message has been sent.

Some cellular telephones also have additional capabilities, such as for receiving facsimile messages, or for connection by way of a modem to a computer. A mobile user may have several network identities, all linked to the same SIM, for controlling different cellular termination devices having different capabilities. The standard at-seat satellite telephone terminal provided in aircraft is not equipped to receive such calls. However, the vehicle on which the terminal is fitted may be provided with a suitable terminal. Accordingly, the selected termination point to which calls are directed may be a termination point other than the first termination point from which the process was initiated. Where such is the case, the interface unit may be arranged to transmit a message to the first termination point to indicate that such a message has been sent to the selected termination point.

If the user termination is in an aircraft or other vehicle connected to a ground station (by satellite or otherwise), it may move from the area covered by one satellite (or ground station) to that of another. In that case, the network address of the termination changes. To accommodate this, the interface may be provided with means to store the address of termination points in the first system, means to record changes to the said addresses transmitted to it from the first system, and means to modify the diversion instruction in the switching system when such a change takes place. Alternatively, the termination points may be arranged simply to repeat the set-up process, causing the mobile unit to be re-registered with the interface unit, (which will not be apparent to the switching system, as it will perceive the same "virtual" base site controller), and to transmit a new call divert instruction to the revised address of the termination point.

The invention also provides a method of initiating, from a first termination point of a first telecommunications system, call diversion instructions in the switching system of a second telecommunications system such that calls initially directed to a telephone apparatus usable with the second telecommunications system are diverted to a selected termination point in the first telecommunications system, the method comprising the steps of;

in the first telecommunications system, identifying the telephone apparatus from which calls are to be diverted and the selected termination point to which calls are to be diverted, indicating to the switching system of the second telecommunications system that the telephone apparatus is in a specified operating condition, irrespective of the true operating condition of the telephone apparatus, and generating an instruction to the switching system to divert calls, intended for the telephone apparatus, to the said selected termination point of the first telecommunications system when the telephone apparatus is indicated as being in the said predetermined operating condition.

This aspect of the invention comprises several separate processes, some of which comprise further aspects of the invention. These processes interact to allow calls made to the telephone apparatus to be routed to the selected termination point.

The first part of the process is carried out, in the described embodiments, by a card reading device or similar apparatus associated with an onboard telephone termination point, which reads an information carrier encoded with the user's identity. The information carrier may be the part of a cellular telephone containing the user identity.

The second part of the process is a method according to a further aspect of the invention, for interconnecting a first telecommunications system with a second telecommunications system to allow calls initially directed to a telephone apparatus usable with the second telecommunications system to be diverted to a selected termination point in the first telecommunications system, comprising the steps of;

receiving, from a first termination point, identification information relating to the telephone apparatus, receiving associated identification information from the first termination point, transmitting the identification information to the second network, receiving authentication data from the second network, and connecting calls to or from the selected termination point in response to said authentication data.

This process is, in the described embodiments, carried out by the ground-based systems of the satellite telephone network.

The third part of the process is a method according to a further aspect of the invention, for interconnecting a first telecommunications system with a second telecommunications system such that calls directed to telephone apparatus configured for use with the second telecommunications system may be diverted to a selected termination point in the first telecommunications system, comprising the steps of:

generating an instruction to the switching system of the second telecommunications system to divert calls directed to the telephone apparatus to the said selected termination point of the first telecommunications system when the telephone apparatus is indicated as being in the said predetermined operating condition receiving data identifying a user and a termination point in the first network, indicating to the switching system of the second telecommunication system that a telephone terminal associated with the user is in a specified operating condition, irrespective of the true operating condition of the telephone terminal, generating an instruction to the switching system of the second telecommunications system to divert calls directed to the telephone user to the said selected termination point of the first telecommunications system when the telephone apparatus is indicated as being in the said predetermined operating condition.

This process is preferably carried out by an interface unit emulating a base site controller of the cellular network.

However, standard on-board satellite telephone card readers may not be compatible with GSM "SIMs", or complete telephones. To avoid the need to modify the user terminals, a user identity may be carried on a special carrier compatible with the existing card readers. This user identity may be the user's cellular radio network identity (IMSI), or some other identity from which it can be derived.

In practice, the user identity required by the network (known in the GSM standard as the IMSI) is unique to one carrier (the "SIM") and is not encoded on any other. This provision is primarily a fraud prevention measure, made to prevent the user identity being used to access a cellular network when the authorised user is actually elsewhere. The invention also requires access to a cellular network when the user is actually not directly connected to that network but is elsewhere, but is communicating through the first telecommunications system. It is therefore necessary for the interface means ("Virtual" Base Site Controller) to obtain the user identity.

Embodiments of the invention will now be described with reference to the Figures, in which:

FIG. 1 is a schematic diagram showing the functional relationships between the systems which co-operate to form one embodiment of the invention FIG. 2 is a more detailed schematic diagram of the network termination and associated card reading equipment, which for illustrative purposes will be assumed to be on board an aircraft FIG. 3 is a diagram showing part of an alternative arrangement of network termination, arranged for co-operation with a cellular telephone handset FIG. 4 is a schematic diagram showing the functional relationships between the components of the fixed part of the first telecommunications system which co-operate in the invention, FIG. 5 is a schematic diagram of the switching system, interface unit, and associated parts of the second telecommunications system;

FIG. 6 is a flow chart showing the process by which a diversion is set up in the second network to a termination connected to the first network FIG. 7 is a flow chart showing the process by which a call coming in to the second network is connected to a telephone connected to the first network FIG. 8 is a flow chart showing the process by which the second network restores the original settings for a telephone when it disconnects from the first network.

FIG. 9 illustrates the forwarding process implemented to a data message.

FIG. 11 is a flow chart showing a call diversion process, for use when the system has to be temporarily shut down.

The following embodiments illustrate the invention using a standard switched cellular network. However, the invention is applicable to other cellular networks, such as packet networks used to carry data over a distributed computer network such as the "Internet", carrying messages using formats such as the "Internet Protocol" (IP). Thus, unless the context clearly demands otherwise, any reference in this specification to switching includes the equivalent routing functions in a packet network of this kind.

Figure 1:
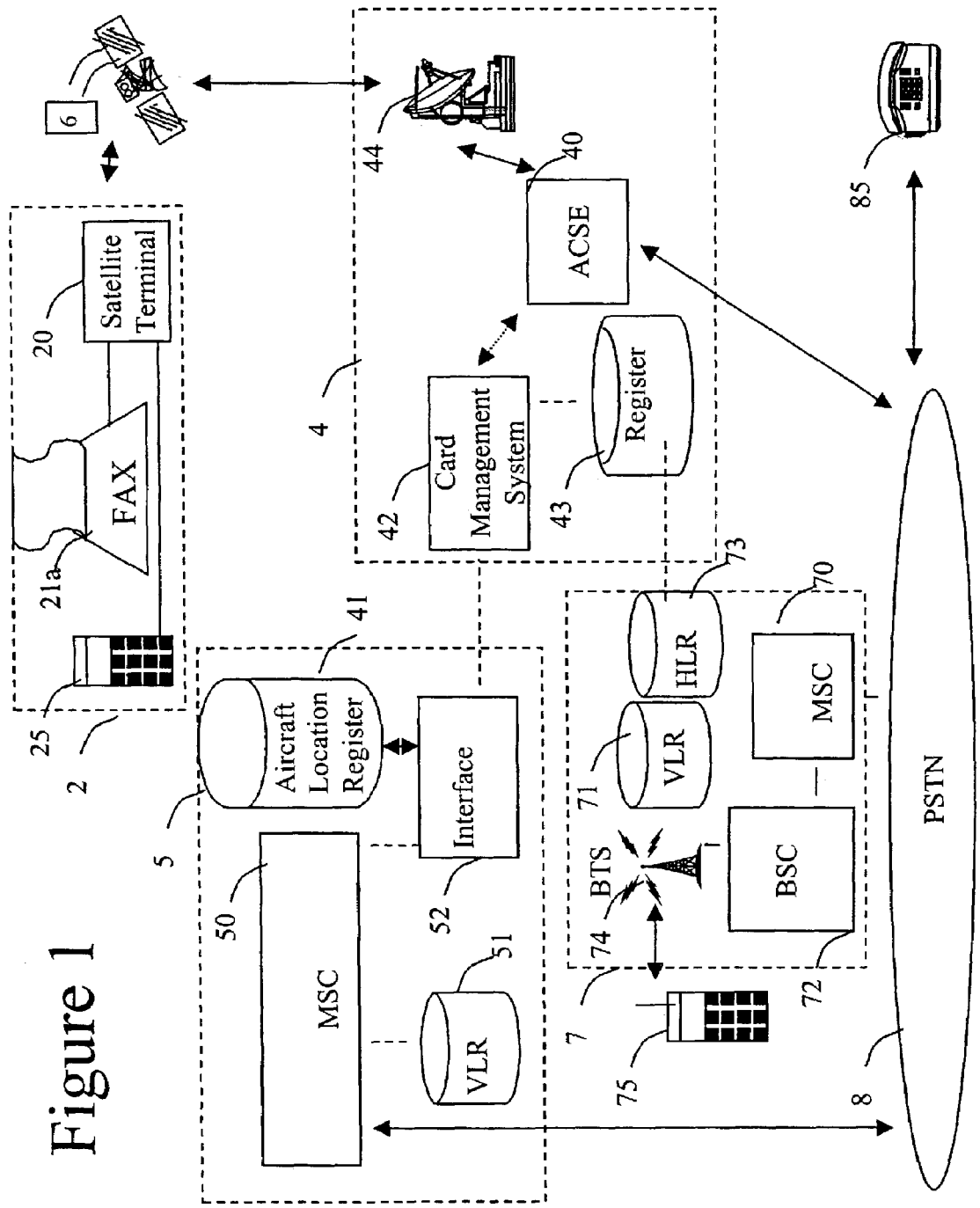

FIG. 1 shows the general arrangement of the various components which co-operate in this embodiment. Note that traffic links (which can carry speech, data, etc) are shown as full lines, signalling links used only for call set up are shown as broken lines.

Figure 2:
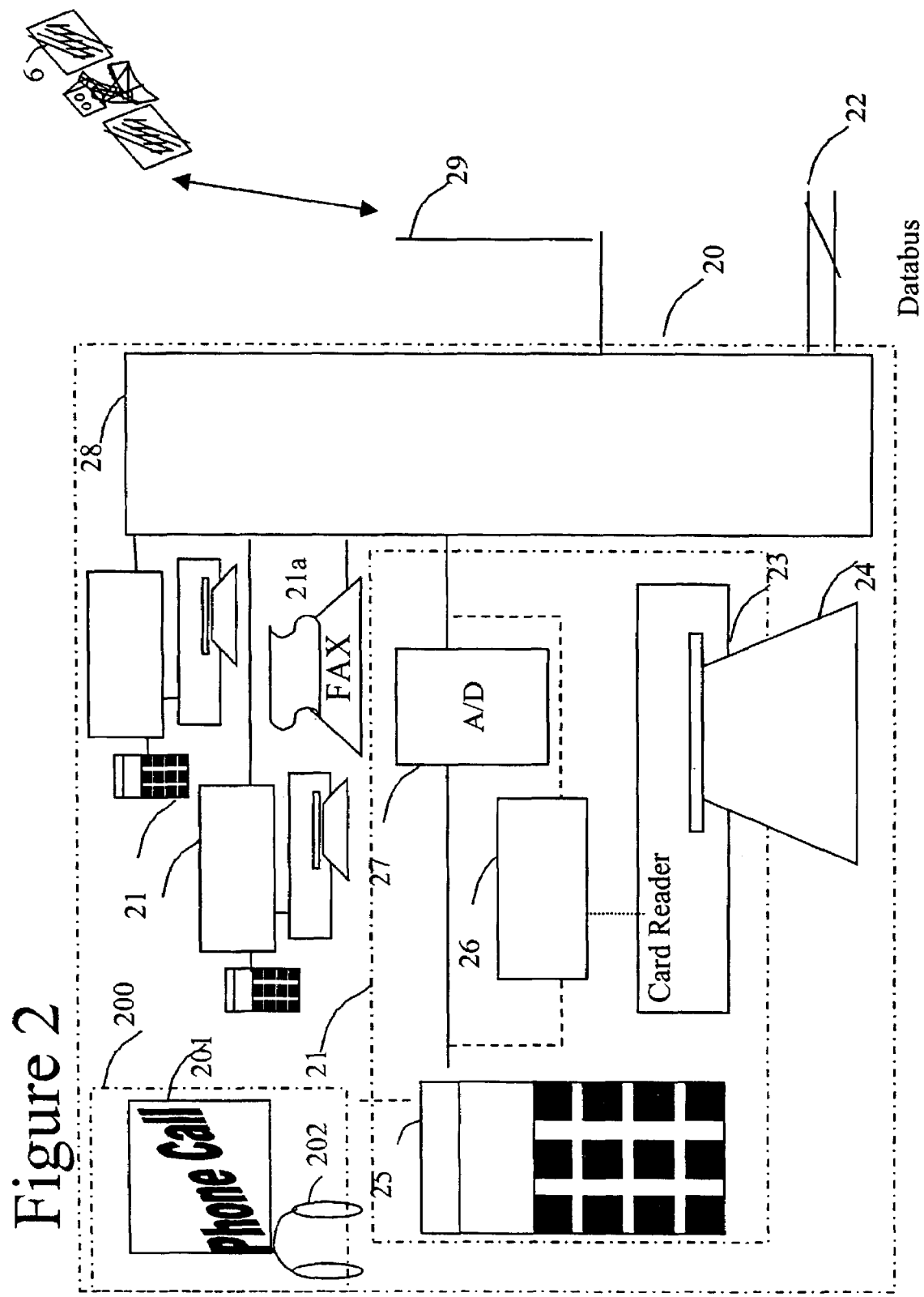
Figure 3:
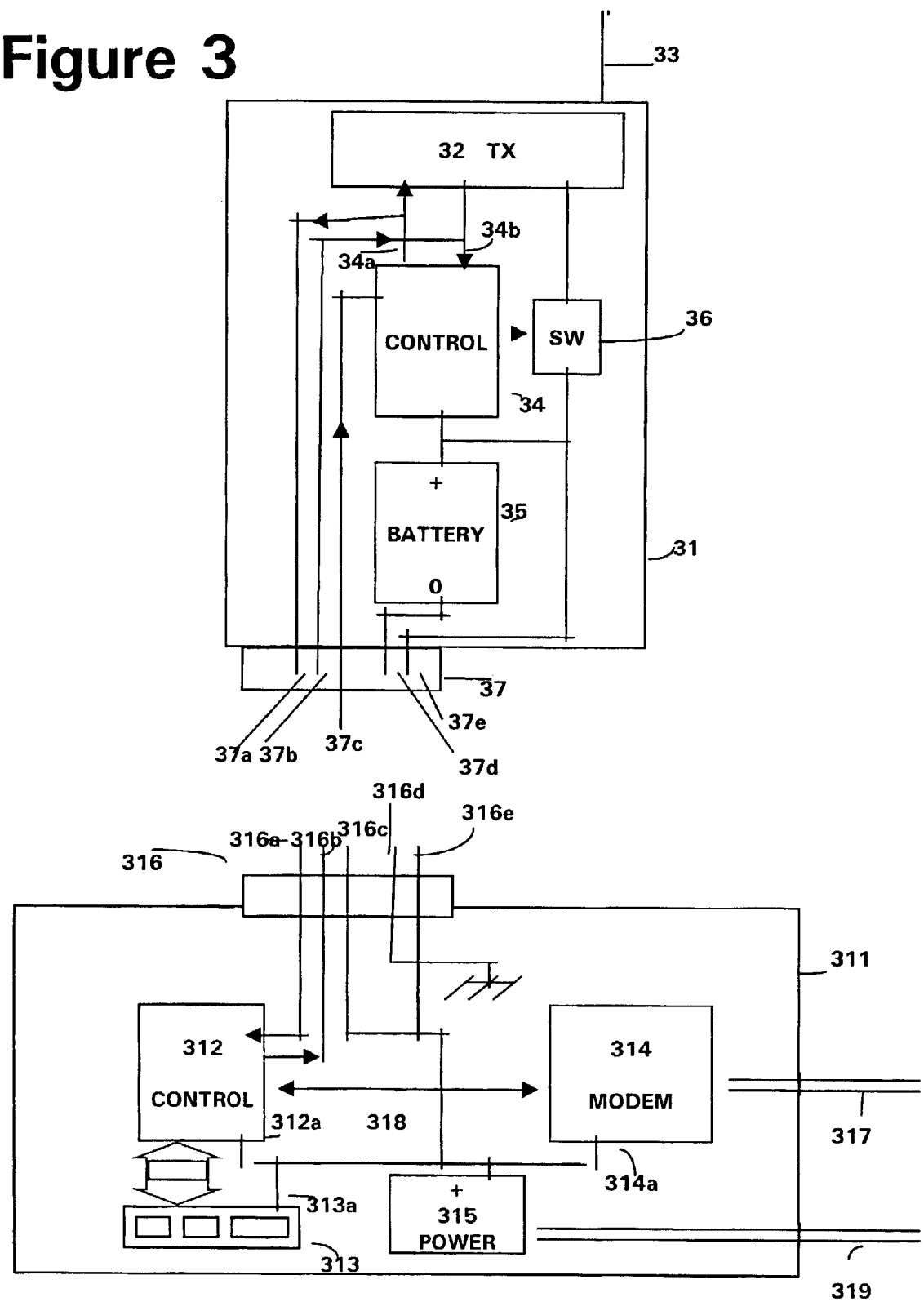

The onboard part 2 (shown in more detail in FIG. 2) comprises one or more handsets 25 (which, in the alternative arrangement of FIG. 3, are the users' own cellular telephone handsets 31), connected to a termination point 20 of the satellite network. The termination point 20 is in communication with a ground station 4, shown in more detail in FIG. 4. In this embodiment, the communication link is made through an earth-orbiting satellite 6.

The principal components of the ground station 4 relevant to this invention are an antenna 44 which communicates, by way of the satellite 6, with the onboard system 2, an Access Control and Signalling Equipment (ACSE) 40 which carries out call switching functions to allow calls to be placed through the public switched telephone network (PSTN) 8 to other telephones 85, and a Card Management System 42 which authorises the use of an individual terminal 25 according to user identities entered with respect to that terminal. There is also a register 43 of card identities, to provide a correspondence between the user identities used by the satellite terminal and the corresponding cellular telephone user identities (not necessary if the cellular telephone identity is read directly by the terminal 20, as will be described with reference to FIG. 3), and to provide billing information.

Figure 5:
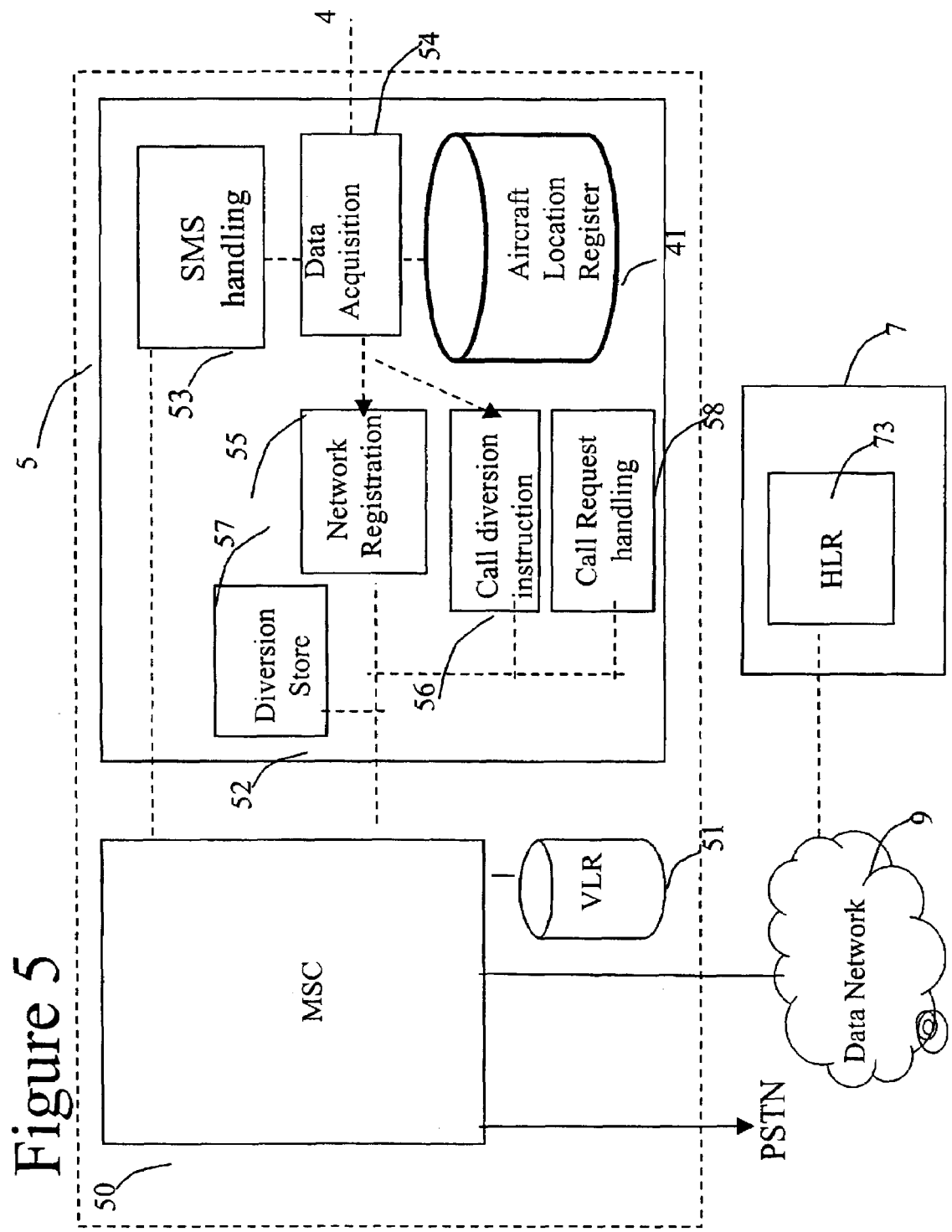

The card management system 42 interacts with an interface unit 52 of a "host" cellular telephone network 5, shown in more detail in FIG. 5. This network 5 is connected to the public switched telephone network (PSTN) 8 and to other cellular networks 7 through a switching centre 50. Associated with the interface unit 52 there is an "aircraft location register" 41 which monitors the terminals currently served by each individual satellite, and modifies the functioning of the interface unit 52 when a terminal 20, for example on board an aircraft 2, moves from the coverage area of one satellite 6 (and its ground station 44) to another.

The cellular network 7 illustrates in simplified form the system architecture of a "GSM"-standard cellular radio system, and the terminology used in this standard. The network 7 has a switching system (MSC) 70 to allow connection of one or more base transceiver sites (BTS) 74, through one or more base site control systems 72, to the PSTN 8 and thus to other telephones 85. A mobile telephone 75 may establish radio contact with one of the base stations 74 in order to make and receive telephone calls. The network 7 also includes a "Visitor Location Register" 71, which maintains details of those cellular telephones 75 currently co-operating with the network 7. Mobile telephones according to the "GSM" standard are capable of co-operating with different networks ("roaming" between networks). To allow this to take place, when a mobile telephone 75 changes from one network to another, the network to which it has moved retrieves data from a "Home Location Register" 73 permanently associated with the handset 75. The network 7 in which the Home Location Register 73 associated with a given handset is to be found is identifiable from the handset's identity code. The Home Location Register also records the identity of the network 7 with which the mobile handset 75 is currently operating.

The "host" network 5 operates like conventional cellular network, but is provided with an interface unit 52, which interacts with the mobile switching centre 50 as a base site controller would. This interface unit 52 may be in addition to one or more base site controllers (not shown). The interface unit does not interact with any base transceiver sites or mobile handsets, but obtains user details (in particular the identity of a mobile handset) from the card management system 42 to allow it to appear to the switching centre 50, and the HLR 73 in the user's home network, that it is in radio communication with a mobile handset 25. It can then control the call forwarding instructions stored in the host network VLR 51, to cause incoming calls directed to that handset to be diverted, through the switching system 40 of the satellite network 4, to the satellite terminal 20.

Figure 4:
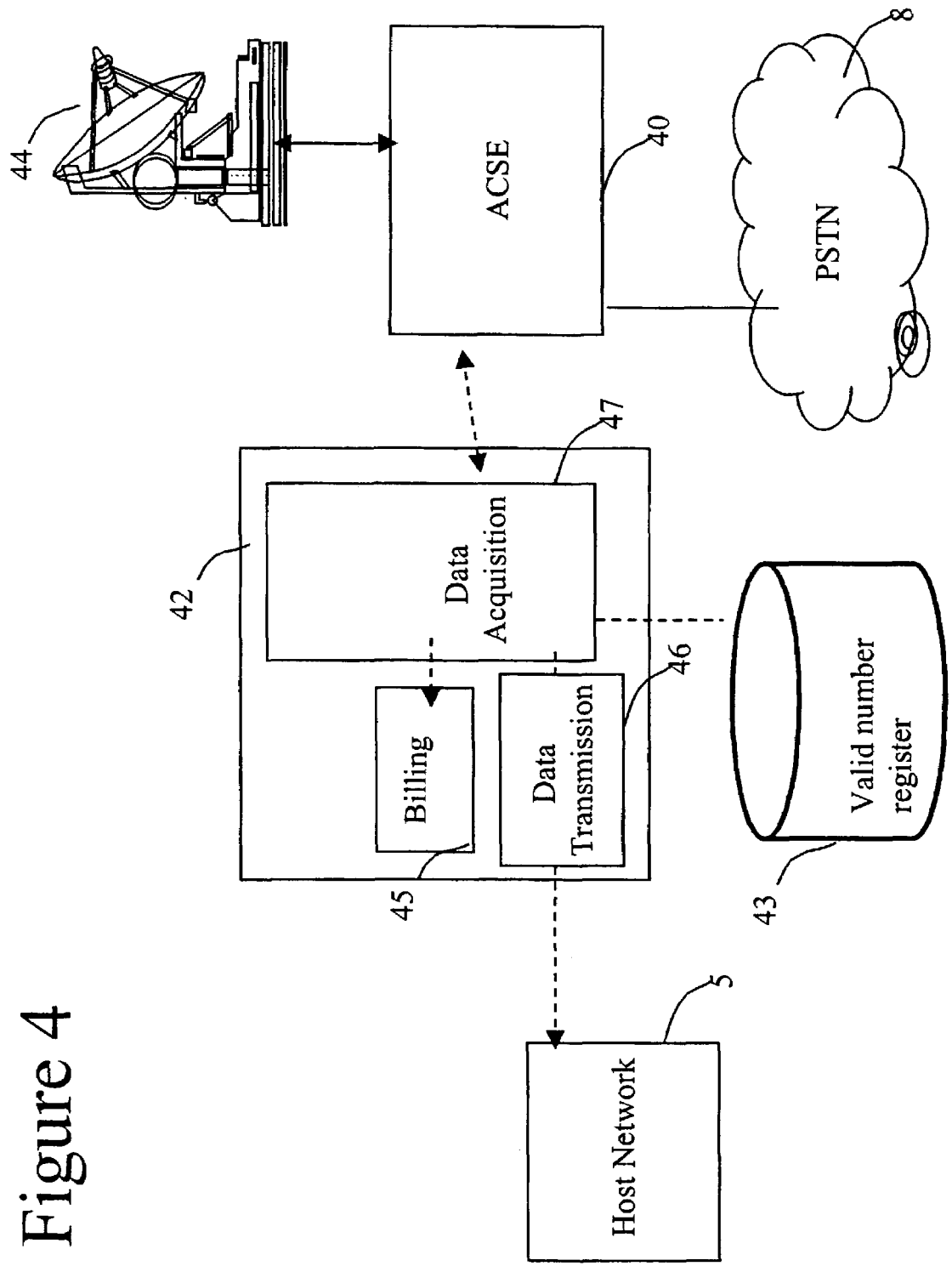

FIGS. 2, 3 and 4 illustrate embodiments of the invention, applied to a satellite telephone system such as that provided by the applicant company under the Registered Trade Mark "Skyphone". FIG. 2 shows a first embodiment of the mobile part which has a standard card reader, whilst FIG. 3 shows an alternative arrangement which allows a user to use his cellular telephone handset. FIG. 4 shows the ground station.

The onboard system 20 shown in FIG. 2 comprises a plurality of user terminals 21, 21*a* (only one shown in detail), connected by a multiplex and radio interface unit 28 to an antenna 29 which provides radio communication with a satellite 6 or a ground station. Each user terminal 21 has a card reading unit 23 into which an intending user can insert a card 24 or other data carrier providing user identification data. The data may give details of the user's credit card account, or a special account for the use of the onboard telephone service. The card reader 23 may be adapted to read the SIM (Subscriber Identity Module) of a GSM-standard cellular telephone. (It should be noted that one variant of the method according to the invention does not make use of the card reading apparatus 23,24,26, although this apparatus may nevertheless be present for use by other customers of the satellite system).

Further user terminals 21*a* may be set aside for non-voice applications, for example an onboard facsimile machine.

The user handset 25 provides the usual keypad, microphone and earphone to allow the user to make telephone calls. The user handset 25 and the card reader 23 are both connected to a processor 26 which converts data read from the card 24, and keystrokes input from the handset 25, into data signals for transmission over the radio link 29. It also provides identification data indicative of which of the terminals 21 it is. A further processor 27 performs analogue/digital conversion of speech signals from the handset 25.

The digitised signals from each terminal 21 are multiplexed and modulated onto a radio carrier in the interface unit 28, and transmitted from the antenna 29.

The antenna 29 also receives signals which are demodulated and demultiplexed in the interface 28. Data signals are processed in the processor 26, whilst digitised speech is converted to analogue speech in the analogue/digital converter 27 and fed to the handset 25.

The interface unit 28 also includes a connection to the data bus 22 of the aircraft 2 giving access to aircraft parameters such as undercarriage deployment, "weight-on-wheels", time to destination, altitude, etc. When a predetermined condition indicative of the impending end of a flight is met, the central unit 28 transmits a signal to the ground station to cause a deregistration signal to be transmitted to the card management system 42.

Because the onboard telephone system was originally designed for making outgoing calls, the handsets 25 provided in existing terminals 21 are not equipped with a suitable call alerting device. The handsets 25 could be modified to provide a buzzer or light to alert the user to an incoming call. Alternatively, to avoid distracting other passengers on the aircraft, the telephone terminal 21 may be connected to an at-seat entertainment system 200, to provide an alert either through the earpieces 202 or on the screen 201.

Instead of the terminals 25, an alternative arrangement may be used as shown in FIG. 3. In this arrangement each onboard terminal 25 is replaced by an onboard interface device 311 to which a user's own mobile radio telephone 31 can be connected electrically, thereby allowing the mobile telephone to be used without using its radio antenna. It is a modification of the system described in the applicant company's International Patent Application WO97/36442, published on 2$^{nd}$ Oct. 1997, to which the reader is referred for further details. In this modified version a GSM (Global System for Mobile communication) mobile telephone 31 comprises r.f. transceiver circuitry 32 coupled to an antenna 33, base band signal processing and control circuitry 34, a rechargeable battery pack 35, a switch 36 and a socket 37. The processing and control circuitry 34 has a data output terminal 34*a* coupled to both the r.f. transceiver circuitry 32 and a first contact 37*a* of the socket 37. A data input terminal 34*b* of the processing and control circuitry 34 is coupled to the r.f. circuitry 32 and a second contact 37*b* of the socket 37. A third contact 37*c* of the socket 37 is coupled to a control input of the processing and control circuitry 34.

Fourth and fifth contacts 37*d*, 37*e* of the socket 37, which are respectively for 0 V and +V power supply lines, power the telephone 31, and may also be arranged to recharge its batteries 35. The +V terminal of the battery pack 35 is also connected to the processing and control circuitry 34 and to an input terminal of the switch 36. The output terminal of the switch 36 is coupled to a +V input terminal of the r.f. circuitry 32. A control terminal of the switch 36 is coupled to an output of the processing and control circuitry 34.

The interface unit 311 comprises a control circuit 312, a user input unit 313, including a keypad and a display, a V.24 33.6 kbit/s modem 314, a power supply unit 315 and a plug 316. The plug 316 has five contacts 316*a*–316*e* which correspond to contacts 37*a*–7*e* of the socket 37 of the mobile telephone 31. The first contact 316*a* of the plug 316 is coupled to a data input terminal of the control circuit 312 and the second contact 316*b* of the plug 316 is coupled to a data output terminal of the control circuit 312. A bi-directional serial link 318 is provided between the control circuit 312 and the modem 314 for modem control and data signals. The third contact 316*c* and fifth contact 316*e* of the plug 316 are coupled to the +V output of the power supply unit 315. The fourth contact 316*d* of the plug 316 is coupled to the interface unit's 0 V supply wiring. The user input unit 313 is coupled to the control circuit 312 for the input of user commands and the output of display control signals from the control unit 312 to the user input unit 313. The +V output of the power supply unit 315 is also coupled to +V input terminals 312*a*, 313*a*, 314*a* of the control circuit 312, the user input unit 313 and the modem 314. The modem 314 is coupled to a telephone line 317 and the power supply unit 315 is arranged to receive power from an electricity supply 319.

When the user wishes to connect to the interface unit 311, he connects the plug 316 of the interface unit 311 to the socket 37 on his telephone 31 by a cable (not shown). The voltage on the third contact 37*c* of the socket 37 is detected by the processing and control circuitry 34 which thereby determines that the telephone 31 has been connected to the interface unit 311. The connection of the battery 35 to the power supply 315 by way of the connections 37*d*/316*d* and 37*e*/316*e* also allows the battery to be recharged.

Once the processing and control circuitry 34 has determined that the telephone 31 has been connected to the interface unit 311, it sends a control signal to the switch 36, causing it to open, isolating the r.f. circuitry 32 from the battery pack 35 and the power supply 315 in the interface unit 311. The processing and control circuitry 34 also responds to the voltage on the third contact 37*c* of the socket 37 by selecting alternative control programs or constant data to allow for delays in the signal path from the telephone 31 to the controller 30 which are caused by the use of the satellite link 6 and the modems 314, 32.

In this arrangement, instead of the need for a separate card reader 23, the telephone 31 identifies itself to the telephone network 40/42 by generating its terminal identity code (IMSI in the case of a GSM telephone). The registration signal is not transmitted from the antenna 3 because the r.f. circuitry 32 is disabled. Instead, it is output to the interface unit 311 via the first contacts 37*a*, 316*a* of the socket 37 and plug 316.

The operation of this onboard system will now be described with reference to FIG. 6. When the card reader 23 or interface unit 311 detects the presence of a card 24 or handset 31 respectively, (step 601) it generates a prompt to indicate to the user that he may wish to have calls diverted to the onboard system. If the user requires this service, he enters a code on the keypad of the handset 25, 31 which causes a divert request to be generated (step 602). The details from the card 23 (or SIM of the handset 31) are then passed to the processor 26 which also provides the identity of the terminal 21 (step 603) and transmits the data to the interface unit 28.

Alternatively, these steps (602, 603) may be activated by the user without a card, by dialling an access code (divert request 602) followed by further keystrokes to identify the account to be used (terminal identity step 603). These keystrokes may include the user's MSISDN (which, as his own directory number would be known to him). To prevent misuse of the system by unauthorised personnel, a security code (Personal Identification Number: "PIN") may be added. This code may have been issued previously to the user, or the user may request such a code by making a call using the satellite system to his home network's customer service department and providing personal details to the operator to prove his identity.

The user may select for the identity of a terminal 21*a* other than his own at seat terminal 21 to be selected as the destination for incoming calls. For example, if his MSISDN code (or one of them) relates to a facsimile machine having cellular capability, he may request that incoming calls to that number be directed to an onboard facsimile machine 21*a*.

The data received by the central unit 28 is then transmitted to the ground station 4 (step 604). The further steps (605–615) in the process are carried out by the co-operating networks 4, 5 and will be described later.

If the user decides that he no longer wishes to have his calls diverted to the terminal 21, he may cancel the diversion instruction by entering a special code on the keypad of the handset 25, 31. Disconnect codes may also be generated in the central unit 28 for all the termination points 21, either by the cabin crew or automatically in response to a signal detected on the aircraft's data bus 22 which is indicative of the imminent end of the journey, such as undercarriage deployment, weight on wheels, low altitude, or time remaining to destination as determined by the aircraft's flight management system. The disconnect instruction is transmitted (step 801, FIG. 8) by way of the switching system 40 in the ground station 4, to the interface unit 52 whose operation (steps 802 to 805) will be described later.

The Ground Station 4 shown in FIG. 4 has a radio antenna system 44 for communicating with the terminal 20, through a satellite link 6 or otherwise. Signals are handled by an Access Control Signalling Equipment (ACSE) 40 which carries out switching functions to route calls to or from the public switched telephone network (PSTN) 8.

A card management system 42 comprises a data acquisition unit 47 which reads data transmitted from the card reader 24, and/or keyed in by the user, to identify the type of user, confirm the user's account details and arrange billing for any calls made, through a billing system 45 which raises invoices, or interacts with the systems of a credit card operator or bank.

In the existing onboard systems a user cannot receive calls, unless the caller knows the unique "AES" number of the handset 21, 21*a*. This is unlikely, as the number depends on the identity of the aircraft, the seat, and the serving satellite or base station.

The conventional ground station equipment just described is augmented in the present embodiment by an interface 46 with the Home Location Register 73 of each network 7 whose subscribers are to be given access to the service. The interface 46 which stores a concordance between the card identities and the card-holder's cellular radio telephone number (MSISDN: mobile systems integrated services data network number), on request from the data acquisition unit 42, which is arranged to recognise the card identities which require such translation. In a preferred embodiment the concordance is supplied to a register 43 in the ground station by the operator of user's home network 7, when the network operator provides the user with the card. The operator of the home network 7 also records the concordance in its own Home Location Register 73. This arrangement allows the existing card readers 23 to be used on board the aircraft, without modification. If the users' mobile subscriber identities are supplied from the onboard system, either by reading the identity (reader 311) or by the user keying it in, the store 43 can be used for verification, or omitted. Billing information is also returned to the user's home network 7.

The operation of the ground station will now be described with reference to FIG. 6. The data acquisition unit 47 receives the card details from the reader 23 (see steps 601 to 604 already discussed) and if it identifies as those details as corresponding to a cellular user (step 605), it retrieves the cellular user identity from the store 43 containing this concordance, or from the HLR 73 of the user's home network, (step 606). (This step can be omitted if the user's mobile network identity is provided by the onboard apparatus 20).

The data transmission unit 46 then generates a signal for transmission of the cellular user identity, together with the identity of the terminal 21, to the cellular network 5 acting as host to the interface (step 607). This host network 5 will, in general, not be the same as the user's home network 7. The further steps (608 to 615) in this process will be described later, with reference to FIG. 5.

If a cancellation signal is received from the aircraft in respect of a given terminal 21, (step 801, previously discussed) the data transmission unit 46 transmits a "cancellation" signal to the host network 5. As already discussed, the cancellation signal may be generated either for an individual handset 21, by its user dialling a special code, or for all handsets as the result signals received by the radio interface unit 28 over the aircraft's data bus 22 indicative of the imminent end of the flight.

An embodiment of the host network 5 of the invention is shown in FIG. 5. Its operation will be discussed with reference to FIGS. 6, 7 and 8. In this network 5 an interface unit 52 is provided, which is arranged to appear to the switching system 50 as if it is a normal base station of the cellular radio system.

Figure 6:
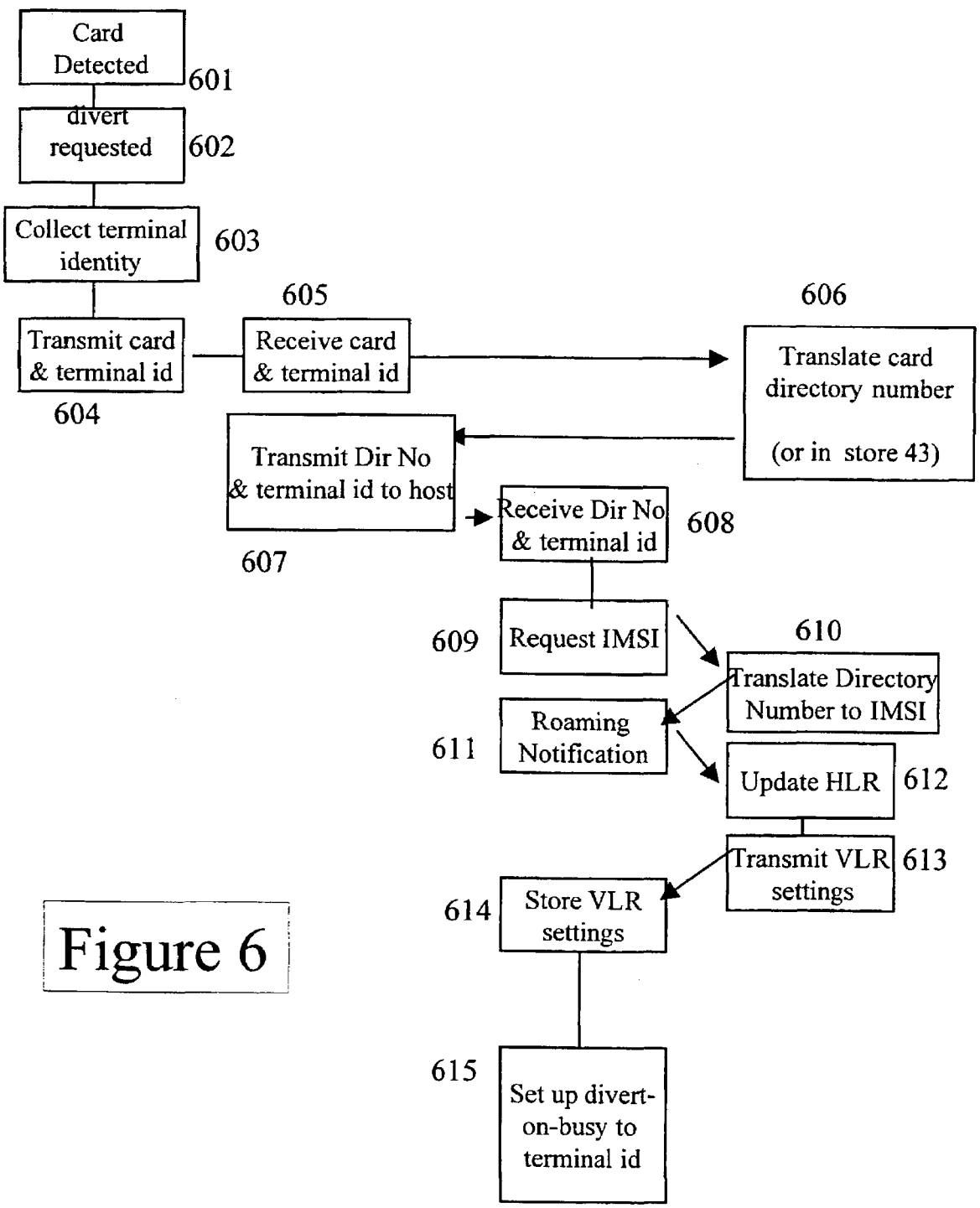
Figure 7:
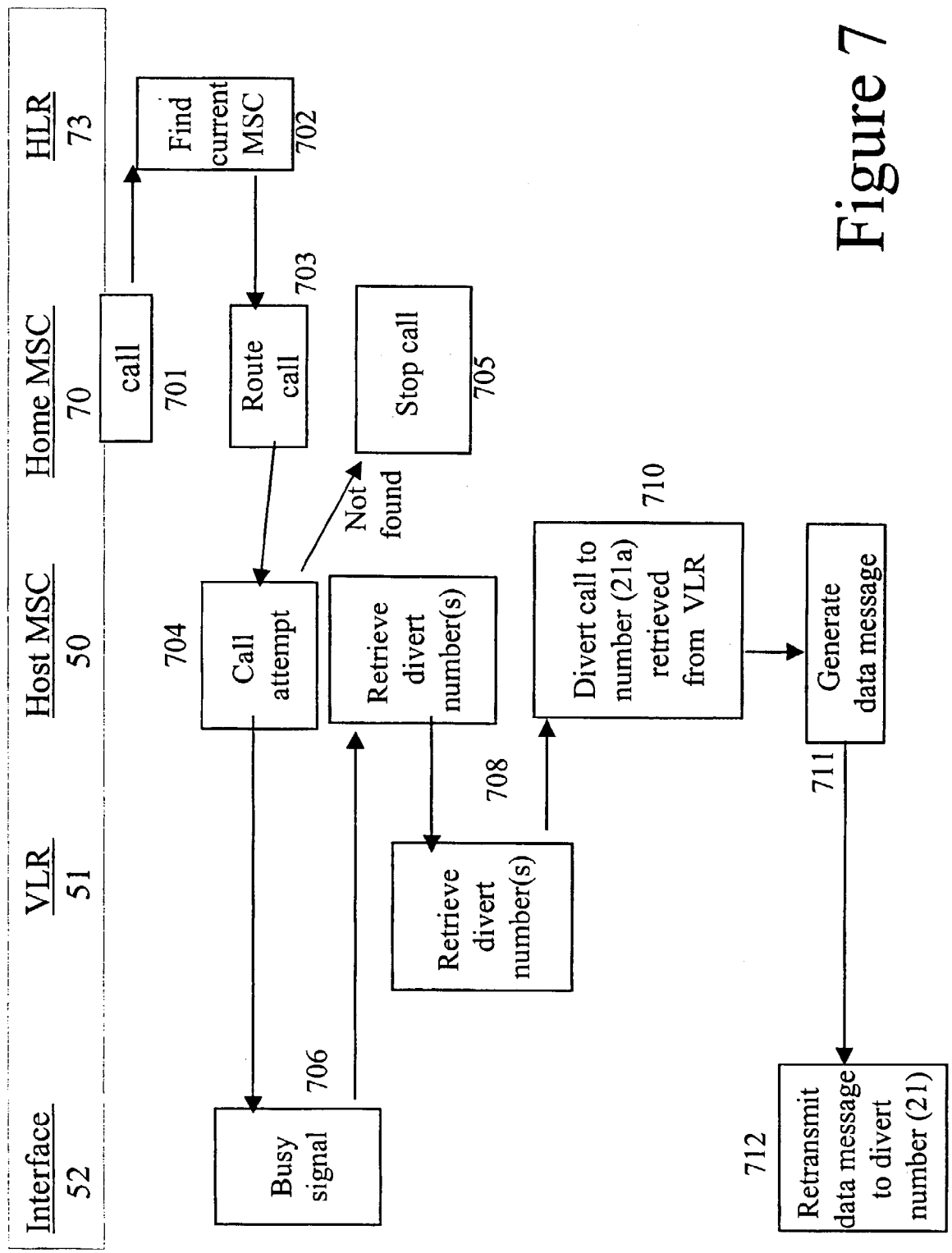

In order to do this, the interface unit 52 is provided with a data acquisition unit 54 which receives from the card management system 42 of the ground station 4 the identity of the cellular telephone it is to represent, and the AES identity of the onboard terminal 20 (step 608, FIG. 6). Mobile telephones have three identification codes: the equipment identity (IMEI, which will not be discussed further here), the directory number (MSISDN) and the actual SIM identity (IMSI). In practice, for security reasons, the IMSI is not made generally known, and a user is normally identified by his MSISDN unless the SIM itself is used. If the SIM is used in the card reader 23, or the user's telephone is used in the arrangement of FIG. 3, (in which case no concordance is required) the IMSI can be read directly from the data received by the data acquisition unit 54. However, if the user keys in his own identification data (step 603), or a concordance is provided by the card reader 23, the data acquisition unit will receive the MSISDN, and not the IMSI. (There may also be a PIN or other security code, which is checked by the data acquisition unit 54).

In the GSM standard it is possible to obtain an IMSI if the MSISDN is known by interrogating the appropriate Home Location Register 73. To do this, the interface unit 52 transmits a "request for routing information" signal, using the MSISDN (step 609). The standard HLR 73 responds to such a request with a signal which includes the IMSI corresponding to the MSISDN in the request (step 610). (This "request for routing information" signal was provided under the GSM standard as a means of obtaining routing information for data messages intended for a destination for which only the MSISDN number is known. However, it may be used for other purposes, such as that described above).

The telephone identity (IMSI), whether obtained directly from the card reader 23 or handset 31, or indirectly as just described, is passed to a network registration unit 55 which exchanges signals with the mobile switching centre 50 in the same way that a real cellular telephone would do. The mobile switching centre therefore informs the user's Home Location Register 73 that the mobile telephone is now registered with the network 5 (step 611). The Home Location Register 73 records that the mobile handset is now registered with host MSC 50 (step 612).

It should be noted that, although registered with the host MSC 50, the user's mobile handset is not operatively connected to the host MSC 50—in fact the mobile handset may be switched off to allow the card 24 to be used, or it may be connected to a user terminal 311. The user may be in an aircraft, anywhere in the world within the coverage area of the satellite network.

The user's details, including any diversion instructions, are sent by the Home Location Register 73 to the network's VLR 51 (step 613). A store 57 records a copy of the details of these diversion instructions (step 614).

Conventionally, any incoming calls for a mobile user are sent in the first instance to the user's home network 7, and the HLR 73 provides information to identify the MSC 50 where the mobile handset can currently be found. Consequently, in the present arrangement, any incoming calls intended for the mobile user will now be directed to the network 5, as the mobile user is currently registered there.

The data acquisition unit 54 in the interface 52 now passes the directory number of the termination point 21 to a call diversion instruction unit 56, which generates a "divert on busy" instruction to the VLR 51 (step 615). This is a standard divert arrangement, and operates such that should the mobile unit appear to be engaged on another call when a call attempt is made to it, the call attempt is diverted to a specified directory number, in this case the termination point 21 or 21a, (identified by its AES code). This diversion instruction replaces any previous instruction held in the VLR 51. Further settings may be made in the call diversion instruction unit 56, such as the identification of a termination point 21 to which a data message is to be sent when a call is diverted to another termination point 21a.

Of course, there is in fact no mobile telephone connected to the interface unit 52, and therefore it is unable to connect incoming calls to the mobile telephone in the conventional way, or to identify the current true operating condition (switched off, busy, ready for calls, etc) of the mobile handset. Instead, the system responds to a call attempt as will now be described with reference to FIG. 7.

When a call attempt is made (step 701), the home MSC to which the call is initially routed obtains from the HLR 73 the current location of the mobile telephone (step 702), and on receiving the identity of the host MSC 50 (step 703), directs the call there (step 703). The host MSC 50 in turn transmits the call attempt to the currently serving base station, which is in fact the interface unit 52 (step 704). If the disconnect procedure (to be described later with reference to FIG. 8) has been carried out, the call will not be connected to the onboard system (step 705), and instead a signal is transmitted back to the home MSC 70. Otherwise, call attempts received by the interface unit 52 are handled by a call request handling unit 58, which automatically returns a "busy" signal to any such request (step 706). The MSC 50, on receiving the "busy" signal, retrieves the diversion information from the VLR 51 (step 708) allowing it to route the call through the PSTN 8 to the user terminal 21, 21a (step 710).

In the event that the destination terminal 21a is not the terminal 21 that originated the instruction, the call request handling unit 58 of the ground-based interface unit 52 may be arranged such that whenever a message addressed to the user's MSISDN is diverted to the terminal 21a, the call request handling unit 58 also generates a data message (step 711) for transmission to the instructing terminal 21 by way of the MSC 50, PSTN 8, and satellite system 4, 6 (step 712) either during the call or after it ends. Such a message can be used for example to alert the user of the terminal 21 that a facsimile message addressed to him has been sent to the terminal 21a. As with the call alerting process described above, the message may be displayed using the in flight entertainment system 200.

If a second call attempt is made, the ACSE 40 may identify that the divert instruction will not work as it is currently handling a diverted call to that number. The default condition in such cases is to arrange for the second call to be diverted to the user's voicemail address (not shown) in his home network 7. The user may also be sent a data message to inform him of the new voicemail message. This message would normally be sent to the mobile unit, which appears to the MSC 50 to be co-operating with the interface unit 52, so the MSC 50 transmits the data message to the interface unit 52 (step 711). In order to inform the user of the new voice mail message, the interface unit 52 now regenerates the data message for forwarding to the user terminal 21 via the MSC 50, PSTN 8, and satellite system 4, 6 (step 712) either during the call or after it ends.

In order to inform the user of the new voice mail message, the interface unit 52 must now forward the data message to the user terminal 21 (step 712) either during the call or after it ends. However, data messages are not suitable for switching via the MSC 50 and PSTN 8, nor for handling by the on-board terminal 21 as it is only equipped for voice. Because the IMSI is recorded in the HLR 73 as being registered with the "Virtual" BSC, or interface unit, 52, any other data messages intended for the user will also be routed to the interface unit 52, and require forwarding to the user. As with the call alerting process described above, the message may be displayed using the in flight entertainment system 200.

Figure 10:
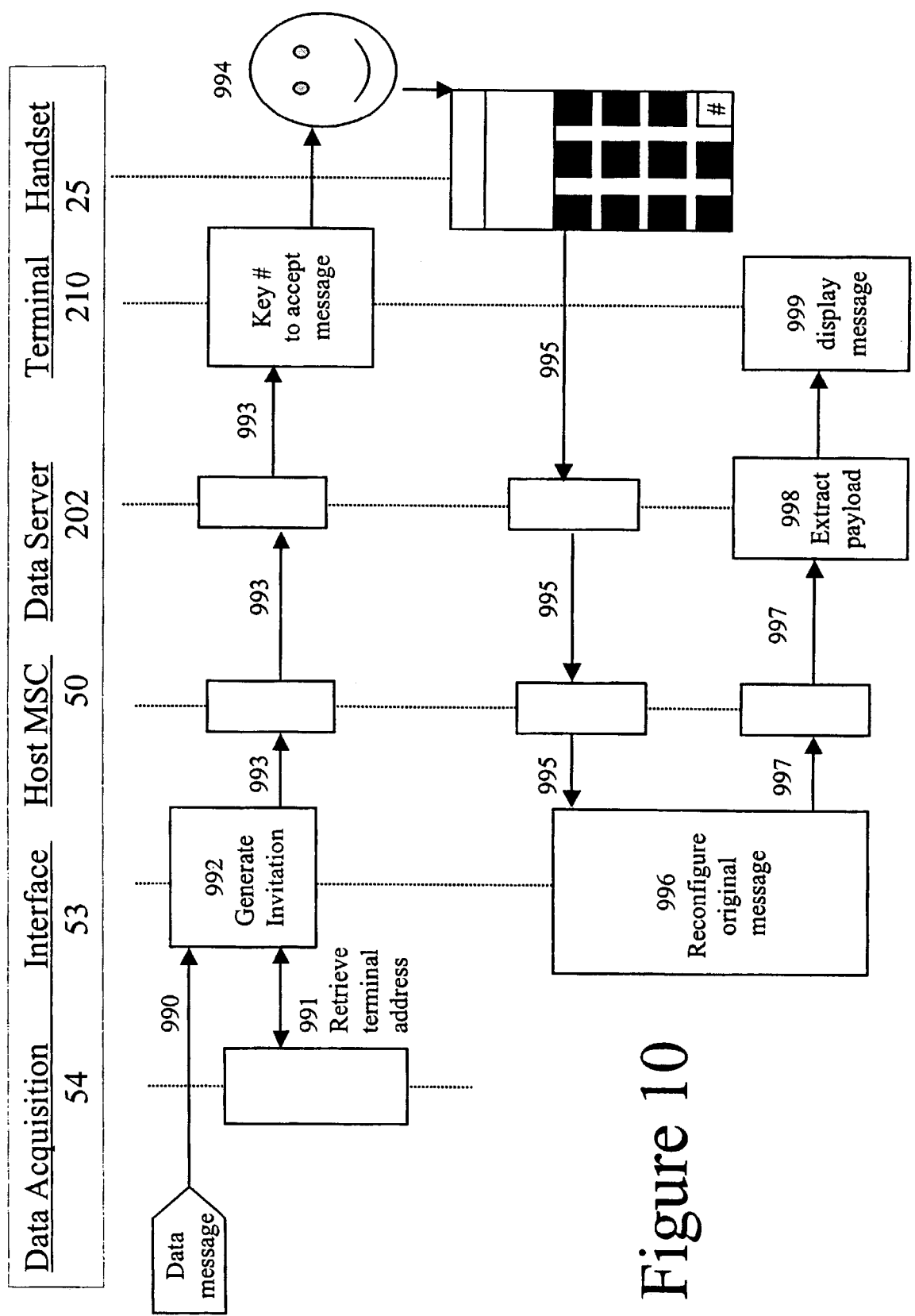
FIG. 10 illustrates a conditional forwarding process for a data message.

To allow the use of the at seat display system 201 for data messages, not suitable for transmission over the PSTN and satellite system in their original form the interface unit 52 is provided with a data handling processor 53 for receiving data messages received over a packet data system 9 by way of the MSC 50 and intended for users currently associated with the interface unit 52. These messages include SMS messages sent from other callers, and SMS messages generated by the MSC 50 itself to alert the user that a message has been sent to the voice mail system. The format of such a message is shown in FIG. 9, and the process of sending and receiving it is shown in FIG. 10.

The original message 900 basically consists of a data payload 901 and an address 902, which is the IMSI of the destination mobile telephone (FIG. 9a).

When the interface unit 53 receives such a data message (step 990) it retrieves from the data acquisition unit 54 the data network address of the at-seat entertainment terminal 200 corresponding to the user's cellular identity which was originally provided to the data acquisition unit 54 when the user carried out the registration procedure (step 991). The interface unit 53 next generates a data call to that address (step 992), in a form suitable for transmission by the MSC 50 (step 993) over the packet data network 9 to the aircraft 2, with an address header corresponding to the data network address of the user's at-seat terminal 200. This data call may be a short message to indicate that a message is awaiting delivery, and displaying on the screen 201 an invitation to the user to dial a special code on his handset 25 to accept the message (step 994), and any charge associated with it. This acceptance is transmitted back, by way of the MSC 50 to the interface unit 53 (step 995). (These steps 992–995 may be omitted if it is not required for users to acknowledge acceptance before receiving a data message).

The interface unit 53 then replaces the address header (the IMSI) 902 in the original data message with a code 912 identifying the terminal 200 and encapsulates the message in a form suitable for transmission over the packet data network 9 to the aircraft (step 996), with an address header 910 to send it to the data network interface server 28 serving the onboard entertainment system 200. It can thus be transmitted to the data interface 28 over the packet data network 9 (step 997), effectively as a packet with an address header 910 and a payload made up of the at-seat terminal number 912 and true payload 901 (FIG. 9b).

On receipt of the data message, the data interface 28 extracts the data message payload 901, 912, (FIG. 9c) (step998) and identifies the individual at-seat terminal 200 identified by the address 912. It can then cause display of the data message payload 901 on the screen 201 of the appropriate terminal (step 999).

If password protection is required, for example to ensure that the user is present when the message is displayed, the payload 901, 912 can also include a password code 913, which causes the interface server 28 to withhold the remainder of the payload until a predetermined sequence of keystrokes has been entered by the user in the terminal 200.

As the termination is itself mobile, being on board an aircraft, call routing to that termination may require revision from time to time. For example, the "Inmarsat" satellite system comprises several geostationary satellites, which each provide cover for part of the earth's surface. These areas of coverage overlap to a large extent, but nevertheless on a long flight the aircraft may pass out of the area covered by one satellite into that served by another. This causes a small but significant change in the network address of any satellite terminal on board the aircraft. The aircraft location register 41 monitors the identity of all aircraft currently being handled by each ground station 4. When an aircraft location is updated, the call diversion instruction unit 56 responds by transmitting a new call diversion instruction to the VLR 51 so that any further incoming call attempts are diverted to the new network address of the terminal. Note that the diversion store 57 is not updated. Note also that this does not affect calls already in progress: there is usually sufficient overlap in coverage areas that handover from one satellite or base station to another can be arranged to take place when no call is in progress.

FIG. 11 shows a process for intercepting calls when the onboard system 1 is switched off at times when its operation could interfere with conventional land-based cellular systems or with electronic control systems of the vehicle, to enforce "quiet" periods on board, or to allow transfer of the satellite link from one satellite to another. The control to switch the system off may be performed manually or under the control of a sensor detecting interference from nearby radio base stations 74, or an operational condition of the vehicle, such as deployment of the aircraft undercarriage, low altitude, or "weight on wheels", communicated to the onboard system by means of a control data bus e.g. 22. When such a disconnection occurs (step 1501), a signal is generated in the onboard system 2 (step 1502) for transmission over the satellite link 6 to the ground station 4 (step 1503). This signal causes the satellite ground station to invoke a call failure mode for any call directed to the onboard system 2 of the specified vehicle (step 1504).

Any call now diverted by the MSC 50 to a number corresponding to a node on board the vehicle (step 1505) will then receive a "call failed" indication from the ground station (step 1506), without any signalling required over the satellite link 6. Such failed calls will be re-routed according to the user's own diversion instructions, stored by the host MSC 50 for use when the user's handset is busy (step 1507). Generally, such instructions will be to divert the call to a voicemail system in the user's home network. In addition, the host MSC 50 will record the existence, and possibly the origin (Calling line identity—CLI) of any such call attempts (step 1508).

When the onboard system 2 is re-activated (step 1511) a further signal is transmitted by the onboard system (step 1512) for transmission over the satellite link 6 to the ground station 4 (step 1513). This signal causes the satellite ground station to revoke the call failure mode for calls directed to the onboard system 2 of the specified vehicle (step 1514). When a user 21 reconnects to the onboard system 2 (step 1515) the onboard system transmits a signal to the host MSC 50 (step 1516) which causes the host MSC 50 to retrieve the call attempt record previously stored for that user (step 1518). If one or more such call attempts have been made, the MSC returns a message to the user terminal 21 (step 1519), prompting the user to retrieve his messages from the voicemail system should he so wish.

Generally, the detection of the same IMSI from two sources would cause the HLR to disconnect both callers as a fraud prevention measure. Since the present system causes the generation of an IMSI from the interface unit 52, instead of directly from the mobile telephone to which that IMSI relates, the user's mobile telephone should be switched off, or connected to an onboard interface device 311 which disconnects the radio circuits, to prevent the network detecting the IMSI in two places, which would disrupt the call routing processes in the HLR 73 and elsewhere. If the user is on board an aircraft, he should not be using his mobile handset in the conventional manner, and so there should be no problem. However, if the user, having left the aircraft, switches on his telephone 75 before the network 5 has reported a loss of the mobile unit from its own network, the mobile unit may be perceived by the HLR 73 as being registered with two networks at once. To avoid this possibility, a disconnection procedure is followed as described with reference to FIG. 8.

As already discussed, a disconnection signal may be transmitted from the on board system 28 to the card management system 42 and thus to the host network's interface unit 52 (step 801). The disconnection signal may be activated by a special code entered by the user 21, or it may be generated automatically by data collected from the aircraft's data bus 22, indicative of the imminent end of the flight. Note that this disconnection signal merely controls the interface 52—it has no effect on calls in progress, which is routed from the MSC 5 by way of the PSTN 8.

The disconnect instruction is received by the interface unit 52 (step 802) and causes the call diversion instruction unit 56 to retrieve the call diversion data stored in the store 57 (step 803) and generate a call diversion instruction restoring the original settings to the VLR 51 (step 804). This ensures no further calls are routed to the onboard terminal 21.

The interface unit 52 next causes the network registration unit 55 in the interface unit 5 to instruct the MSC 50 that the user is no longer connected to the network 5 (step 805). This allows the mobile unit to register with another network 7 in the normal way. Call attempts to the user number will continue to be routed by the Home HLR 73 to the MSC 50 with which the mobile unit was most recently registered, but as the MSC cannot now find the mobile unit, any such incoming call will return a "not found" signal to the home MSC 70 which will divert the call according to any diversion instructions set up, or fail the call. Alternatively, the host MSC 50 may handle the diversion itself if the mobile unit is "not found", using the original diversion instructions now in the VLR 51, having been retrieved from the store 57 (step 804 above).

Having left the aircraft, the user may switch on his mobile telephone 75, which will register with the local network (e.g.7) and will retrieve the original divert information from the HLR 73 (note that in general the HLR 73 will not be in the same network), and will cause all data relating to the user to be deleted from the VLR 51 in the "host" network 5.

The invention claimed is:

1. A method for forwarding incoming cellular communications to an aircraft, comprising:
   receiving a request to divert incoming calls for a cellular telephone number to a communication system on board an aircraft;
   associating a divert on busy instruction with the cellular telephone number, the divert on busy instruction representing an instruction to forward an incoming call for the cellular telephone number to the communications system aboard the aircraft; and
   considering a state of a cellular telephone associated with the cellular telephone number as busy, regardless of an actual state of the cellular telephone;
   wherein, an incoming telephone call to the cellular telephone number is forwarded, consistent with said considering and in accordance with the divert on busy instruction, to the communications system on board the aircraft.

2. The method of claim 1, wherein said associating a divert on busy instruction comprises giving priority to an address of the communications system on board the aircraft over any previous divert on busy instruction.

3. The method of claim 1, wherein the communication system on board the aircraft is a telephonic device aboard the aircraft.

4. The method of claim 1, wherein the communication system on board the aircraft is a communication device electrically coupled with a cellular telephone aboard the aircraft.

5. The method of claim 1, wherein the communication system on board the aircraft is a facsimile machine.

6. The method of claim 3, wherein the telephonic device is an aircraft telephone handset station.

7. The method of claim 1, wherein said associating a divert on busy instruction comprises modifying a preset divert on busy instruction associated with the cellular telephone to include the communication system on board the aircraft.

8. The method of claim 1, further comprising:
receiving an incoming call for the cellular telephone number; and
forwarding the incoming call to the communication system on board the aircraft.

9. The method of claim 1, the cellular telephone having at least one original divert on busy instruction prior to said associating a divert on busy instruction, the method further comprising:
receiving an incoming call for the cellular telephone number;
diverting, in response to an actual state of the cellular telephone being busy, the incoming call consistent with the at least one original divert on busy instruction.

10. A method for routing incoming cellular telephone traffic through a land-based host network to a cellular device user aboard an aircraft, the cellular device user having an associated cellular telephone number, comprising:
receiving, at the host network, a request to register the presence of the cellular device user aboard the aircraft;
the host network advising the cellular device user's home network that the cellular device user is within the operating jurisdiction of the host network;
associating, at the host network, a primary divert on busy instruction with the cellular telephone number, the divert on busy instruction representing an instruction to divert an incoming call to a communication system on board the aircraft; and
considering a current operational state associated with the cellular telephone number as busy, regardless of an actual operational state of the cellular device;
wherein, upon receipt of an incoming call to the cellular telephone number, the host forwards an incoming call to the communication system on board the aircraft consistent with the primary divert on busy instruction.

11. The method of claim 10, wherein said associating a primary divert on busy instruction comprises giving an identifier of the communication system on board the aircraft priority over any preset divert on busy instruction.

12. The method of claim 10, wherein the communication system on board the aircraft is a telephonic device aboard the aircraft.

13. The method of claim 10, wherein the communication system on board the aircraft is a communication device electrically coupled with a cellular telephone aboard the aircraft.

14. The method of claim 10, wherein the communication system on board the aircraft is a facsimile machine.

15. The method of claim 12, wherein the telephonic device is an aircraft telephone handset station.

16. The method of claim 10, wherein said associating the primary divert on busy instruction comprises modifying preset diversion instructions associated with the cellular telephone to include the communication system on board the aircraft.

17. The method of claim 10, further comprising:
receiving an incoming call for the cellular telephone number; and
forwarding the incoming call to the communication system on board the aircraft.

18. The method of claim 10, the cellular telephone having at least one original divert on busy instruction prior to said associating a primary divert on busy instruction, the method further comprising:
receiving an incoming call for the cellular telephone number; and
diverting, in response to an actual state of the cellular telephone being busy, the incoming call consistent with the at least one original divert on busy instruction.

19. A method of registering to divert a telephone call to a telecommunications device on-board a vehicle, the method comprising:
receiving first and second identification information, the first identification information being associated with a cellular device, the second identification information being associated with the telecommunications device;
associating modified divert on busy instructions with the cellular device that identify the telecommunications device as a divert on busy instruction; and
setting an indication of a status of the cellular device as busy regardless of an actual status of the cellular device.

20. The method of claim 19 further comprising the steps of:
receiving a telephonic call intended for the cellular device;
diverting the telephonic call to the on-board telecommunications device consistent with the primary divert on busy instruction.

21. The method of claim 19 wherein the on-board telecommunications device includes a facsimile device.

22. The method of claim 19, wherein said associating comprises inserting a telecommunications device identifier as a primary divert on busy instruction within any existing divert on busy instructions.

23. The method of claim 19, wherein said receiving, associating and setting occur at a host network, the cellular device is associated with a home network different from the host network, and said method further comprising advising the home network that the cellular device is roaming within the coverage of the host network.

24. A method of registering to divert incoming cellular telephone calls to an on-board telecommunications device, the method comprising:
registering a cellular device as roaming on a host network regardless of the actual location of the cellular device relative to the host network; and
updating, in response to said registering, a primary divert-on-busy instruction of the cellular device as an on-board telecommunication device.

25. The method of claim 24, further comprising setting an indication of a status of the cellular device as busy regardless of an actual status of the cellular device.

26. The method of claim 24, wherein the cellular device is associated with a home network, said method further comprising advising the home network that the cellular device is roaming on the host network.

27. The method of claim 24 further comprising the steps of:
receiving a telephonic call placed to the cellular device; and
diverting the telephonic call to the on-board telecommunications device.

28. The method of claim 24 wherein the on-board telecommunications device includes a facsimile device.

29. A method of receiving a telephonic call placed to a mobile station at a telecommunications device on-board a vehicle comprising:
- receiving a call forwarded from a home network, the call being placed to the mobile station;
- returning a busy signal for the mobile station regardless of an actual state of the mobile station;
- accessing a divert-on-busy instruction for the mobile station; and
- forwarding the call to the vehicle consistent with said accessing;
- wherein the call terminates at the telecommunications device on-board the vehicle.

30. The method of claim 29, wherein the on-board telecommunications device comprises a facsimile device.

31. The method of claim 29, further comprising setting an indication of a status of the mobile station as busy regardless of an actual status of the cellular device.

32. The method of claim 29, wherein the mobile station is associated with the home network, said method further comprising advising the home network that the cellular device is roaming on a host network.

33. A method of receiving a telephonic call placed to a cellular device at a telecommunications device on-board a vehicle comprising:
- receiving first and second identification information, the first identification information being associated with a cellular device, said second identification information being associated with the telecommunications device;
- associating modified divert on busy instructions with the cellular device that identifies the telecommunications device as a divert on busy option;
- setting an indication of a status of the cellular device as busy regardless of an actual status of the cellular device;
- receiving a call forwarded from a home network, the call being placed to the cellular device;
- accessing the modified divert on busy instructions for the cellular device; and
- forwarding the call to the telecommunications device consistent with said accessing;
- wherein the call terminates at the telecommunications device on-board the vehicle.

34. The method of claim 33, wherein the on-board telecommunications device includes a facsimile device.

35. The method of claim 33, wherein the mobile station is associated with the home network, said method further comprising advising the home network that the cellular device is roaming on a host network.

36. The method of claim 33, wherein said associating comprises inserting a telecommunications device identifier as a primary divert on busy instruction within any existing divert on busy instructions.

37. The method of claim 33, said method further comprising routing, when said actual status of the cellular device is busy, the call consistent with the existing divert on busy instructions.

* * * * *